E. Ripley.

Tea Kettle.

No. 3,257. Reissued Jan. 5, 1869.

Witnesses.
R. T. Campbell
J. A. Campbell

Inventor.
Ezra Ripley
by
Mason, Fenwick & Lawrence

United States Patent Office.

EZRA RIPLEY, OF TROY, NEW YORK.

*Letters Patent No.* 31,035, *dated January* 1, 1861; *reissue No.* 2,122, *dated December* 5, 1865; *reissue No.* 3,257, *dated January* 5, 1869.

DIVISION NO. 2.

IMPROVEMENT IN TEA-KETTLES.

The Schedule referred to in these Letters Patent and making part of the same.

*To all whom it may concern:*

Be it known that I, EZRA RIPLEY, of Troy, in the county of Rensselaer, and State of New York, have invented a new Mode of Applying Edgewise-Swinging Covers to Tea-Kettles, and other similar spouted and bailed vessels; and I do hereby declare that the following is a full, clear, and exact description of my invention embraced by Division No. 2, reference being had to the accompanying drawings, making a part of this specification, in which—

Similar letters of reference indicate corresponding parts in the several figures.

This invention consists in applying an edgewise-swinging cover to a tea-kettle or other vessel, by pivoting said cover to a vertical stud or pivot, which is cast on or otherwise applied to the vessel in such a position that the cover shall be allowed to swing or move laterally and in the plane of its flat sides, over and off the opening in the top of the vessel, at the same time providing for confining the cover down in place, so that when closed over said opening, a tightly-fitting joint will be obtained, which will prevent an undue escape of steam at such point, as will be hereinafter explained.

To enable others skilled in the art to understand my invention, I will describe its construction and operation.

Under this division I shall describe and claim a novel mode of hinging or pivoting an edgewise-swinging cover to a vessel, so that in the act of tilting the vessel the cover, if open, will close by its own gravity, and, if closed, will remain so, thereby preventing steam from escaping, to the injury or inconvenience of the person handling the vessel.

The broad principle of applying an edgewise-moving cover to a tea-kettle, or other spouted and bailed vessel, forms the subject of Division 1, and is not claimed under this division.

In the accompanying drawings, I have represented my invention applied to a tea-kettle—

A being the body of the kettle;

B, the spout thereof;

C, its bail; and

D, the edgewise-swinging cover.

The bail C is pivoted, by hooked attachments, to two lugs, *a b*, which are both arranged in a vertical plane, passing through the centre of the body of the kettle and its spout.

The lugs *a b*, shown in figs. 1, 2, 3, and 4, are both fast upon the top of the kettle, the rear lug rising vertically from a flat surface, *c*, which is in the plane of the margin *c'*, that surrounds the opening in the kettle, which the cover D is designed to close.

The lug *b* rises from an enlargement or projecting portion, F, of the body of the kettle, which projecting portion is cast with and forms a fixed part of the kettle, and affords not only a base-support for the lug *b*, but a like support, upon the flat surface *c* of which the ear *d* can properly bear during the articulations of the cover D.

Figure 1:
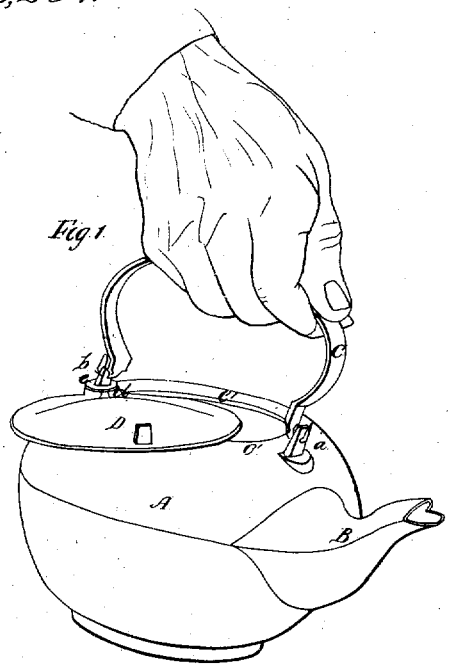
Figure 1 is a perspective view, showing my invention applied to a tea-kettle.
Figure 2:
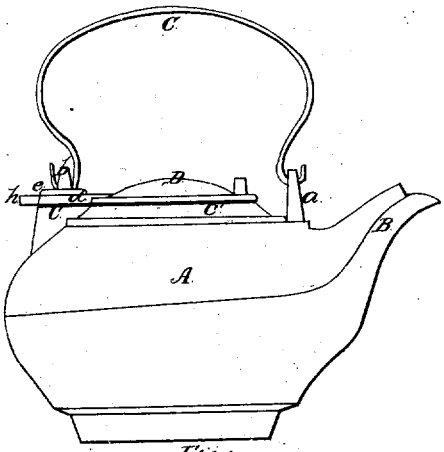
Figure 2 is a side view of a tea-kettle having the invention applied to it.
Figure 3:
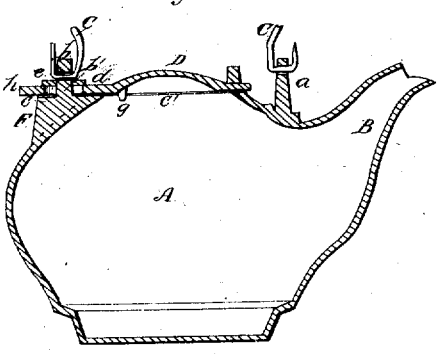
Figure 3 is a vertical section, taken centrally through the improved kettle.

This lug *b* is constructed with a pivotal base, $b^1$, which forms a pivot about which the cover D swings, and which passes up through a neck or ear, *d*, on the margin of cover D, and also through a washer, *e*, which latter, together with the cover, is held down in place by means of the rear hook on bail C, passing through a hole made through lug *b*, as clearly shown in fig. 3.

The bottom flat edge of the cover will, in this manner, be held down snugly upon the top surfaces *c c'*, and the cover will be allowed to open and shut with edgewise or lateral-swinging movement.

Figure 5:
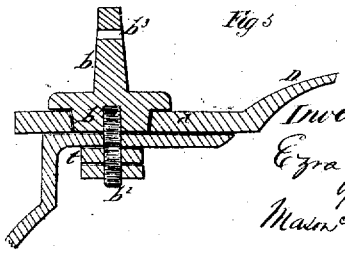
Figure 5 is a sectional view in detail, showing a modification of the cover-attachment.

In fig. 5, I have shown a modification of the combined lug-and-cover pintle above described.

This lug *b* is constructed with a pintle, $b^1$, a screw-stem, $b^2$, and an eye, $b^3$, through which latter the rear hook of the bail passes, as shown in fig. 5.

To apply this lug to the kettle, a hole is made through the kettle, as indicated in the drawings, and through this hole the screw-stem $b^2$ is passed, and provided with one or more nuts, by which it is confined in place.

Previous to applying this lug, the cover D is adjusted in place on the kettle, with the opening through its ear *d*, over the hole which receives the screw-stem.

Thus it will be seen that when the lug *b* is fastened in its place by a nut, *t*, the portion $b^1$ will form the pivot for the cover, and the shoulder just above this pivot $b^1$, will hold the cover down on its seat, but allow it to swing edgewise, as above described.

Figure 4:
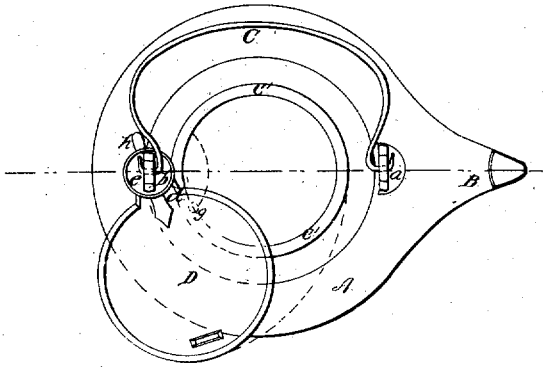
Figure 4 is a top view of the kettle.

The stud *g*, which is secured to the bottom of the cover D, shown in figs. 3 and 4, is designed to serve as a stop for this cover, both when it is opened and when closed, by abutting against the margin surrounding the opening in the top of the kettle; and the small lug or extension *h*, at the rear edge of the ear *d* of the cover, is designed to serve as a convenient means for allowing the cover to be opened or shut when desired; but this extension does not form an important part of my invention.

Having described my invention,

What I claim as new, under this division, is—

1. An edgewise-movable cover of a tea-kettle or other like vessel, pivoted to a permanently-fixed or a removable pintle, substantially as described.

2. A combined bail-lug and pivotal attachment for an edgewise-movable cover, constructed and applied to a tea-kettle or other bailed and spouted vessel, substantially as described.

3. The flat-surfaced base or offset F, formed on a tea-kettle or other bailed vessel, and having a bail-lug rising perpendicularly from it, in combination with an edgewise-movable cover to such vessel, substantially as described.

4. The combination of lug *b*, edgewise-movable cover D, and washer *e*, with the bail or handle C, substantially as described.

5. The construction of the cover D with a perforated offset or ear, *d*, upon its circumference, by which said cover can be pivoted to a tea-kettle or other like vessel, so as to have an edgewise-swinging or vibrating movement, substantially as described.

Witnesses: EZRA RIPLEY.

R. T. CAMPBELL,

J. N. CAMPBELL.